(12) United States Patent
Sikdar et al.

(10) Patent No.: US 7,478,223 B2
(45) Date of Patent: Jan. 13, 2009

(54) SYMBOL PARSING ARCHITECTURE

(75) Inventors: Somsubhra Sikdar, San Jose, CA (US); Kevin Jerome Rowett, Cupertino, CA (US); Rajesh Nair, Fremont, CA (US); Komal Rathi, Sunnyvale, CA (US)

(73) Assignee: Gigafin Networks, Inc., Cupertino, CA (US)

( * ) Notice: Subject to any disclaimer, the term of this patent is extended or adjusted under 35 U.S.C. 154(b) by 19 days.

(21) Appl. No.: 11/365,051

(22) Filed: Feb. 28, 2006

(65) Prior Publication Data

US 2006/0168309 A1 Jul. 27, 2006

Related U.S. Application Data

(63) Continuation of application No. 11/181,527, filed on Jul. 14, 2005, which is a continuation-in-part of application No. 10/351,030, filed on Jan. 24, 2003, now Pat. No. 7,130,987.

(60) Provisional application No. 60/591,978, filed on Jul. 28, 2004.

(51) Int. Cl.
*G06F 7/00* (2006.01)
(52) U.S. Cl. .................................. 712/200
(58) Field of Classification Search ............... 712/200
See application file for complete search history.

(56) References Cited

U.S. PATENT DOCUMENTS

| 4,837,735 | A |   | 6/1989  | Allen et al. |
| 5,193,192 | A |   | 3/1993  | Seberger |
| 5,487,147 | A |   | 1/1996  | Brisson |
| 5,619,718 | A |   | 4/1997  | Correa |
| 5,632,034 | A |   | 5/1997  | O'Farrell |
| 5,694,125 | A |   | 12/1997 | Owsley et al. |
| 5,748,905 | A |   | 5/1998  | Hauser |
| 5,754,740 | A |   | 5/1998  | Fukuoka et al. |
| 5,781,729 | A |   | 7/1998  | Baker et al. |
| 5,793,954 | A |   | 8/1998  | Baker et al. |
| 5,805,808 | A |   | 9/1998  | Hasani et al. |
| 5,818,873 | A |   | 10/1998 | Wall et al. |
| 5,916,305 | A | * | 6/1999  | Sikdar et al. ................. 709/236 |
| 5,991,539 | A |   | 11/1999 | Williams |
| 6,000,041 | A |   | 12/1999 | Baker et al. |
| 6,034,963 | A |   | 3/2000  | Minami et al. |
| 6,085,029 | A |   | 7/2000  | Kolawa et al. |
| 6,122,757 | A |   | 9/2000  | Kelley |

(Continued)

OTHER PUBLICATIONS

*Can Programming be Liberated from the von Neumann Style? A Functional Style and Its Algebra of Programs* (John Bakus, *Communications of the ACM*, Aug. 1978, vol. 21, No. 8, pp. 613-641).

(Continued)

*Primary Examiner*—Eric Coleman
(74) *Attorney, Agent, or Firm*—Stolowitz Ford Cowger LLP (57) ABSTRACT

A devices and method for parsing a data stream comprises a parser stack configured to store one or more parsing symbols, each parsing symbol representing a different state of data stream parsing, a table interface configured to retrieve one or more production rules from a production rule table according to the parsing symbols, and a state machine configured to control the parsing of a data stream according to the retrieved production rules.

19 Claims, 9 Drawing Sheets

U.S. PATENT DOCUMENTS

| | | | |
|---|---|---|---|
| 6,145,073 | A | 11/2000 | Cismas |
| 6,208,649 | B1 | 3/2001 | Kloth |
| 6,266,700 | B1 | 7/2001 | Baker et al. |
| 6,330,659 | B1 | 12/2001 | Poff et al. |
| 6,341,130 | B1 | 1/2002 | Lakshman et al. |
| 6,356,950 | B1 | 3/2002 | Tillman et al. |
| 6,493,761 | B1 | 12/2002 | Baker et al. |
| 6,549,916 | B1 | 4/2003 | Sedlar |
| 6,665,725 | B1 * | 12/2003 | Dietz et al. ................ 709/230 |
| 6,763,499 | B1 | 7/2004 | Friedman et al. |
| 6,862,281 | B1 | 3/2005 | Chandrasekaran |
| 6,892,237 | B1 | 5/2005 | Gai et al. |
| 6,904,057 | B2 | 6/2005 | Sarkinen et al. |
| 6,920,154 | B1 | 7/2005 | Achler |
| 6,952,666 | B1 | 10/2005 | Weise |
| 6,985,964 | B1 | 1/2006 | Petersen et al. |
| 7,003,118 | B1 * | 2/2006 | Yang et al. ................ 380/287 |
| 7,024,516 | B2 | 4/2006 | Lu |
| 7,031,267 | B2 * | 4/2006 | Krumel ...................... 370/255 |
| 7,149,640 | B2 | 12/2006 | Lawrence et al. |
| 7,188,168 | B1 * | 3/2007 | Liao ........................... 709/224 |
| 2001/0005369 | A1 | 6/2001 | Kloth |
| 2001/0056504 | A1 | 12/2001 | Kuznetsov |
| 2002/0078115 | A1 | 6/2002 | Poff et al. |
| 2002/0083331 | A1 | 6/2002 | Krumel |
| 2002/0116527 | A1 | 8/2002 | Chen |
| 2003/0060927 | A1 | 3/2003 | Gerbi et al. |
| 2003/0165160 | A1 | 9/2003 | Minami et al. |
| 2003/0200324 | A1 * | 10/2003 | Jeong ......................... 709/230 |
| 2004/0062267 | A1 | 4/2004 | Minami et al. |
| 2004/0081202 | A1 | 4/2004 | Minami et al. |
| 2004/0215976 | A1 | 10/2004 | Jain |
| 2005/0021825 | A1 | 1/2005 | Kishore |
| 2005/0165966 | A1 | 7/2005 | Gai et al. |

OTHER PUBLICATIONS

*Compliers Principles, Techniques and Tools* (Alfred V. Aho, Ravi Sethi, Jeffrey D. Ullman, Mar. 1998, pp. 186-192, 216-257).

Aho, Alfred V., Sethi, Ravi, Ullman, Jeffrey D., Compilers Principles, Techniques, and Tools, Addison-Wesley Publishing Mar. 1988, pp. 1-4, 181, 182, 191-193, 215, 236, 257, 463.

Chisvin, L., et al., Content-Addressable and Associative Memory: Alternatives to the Ubiquitous RAM, Computer, IEEE Service Center, Los Alamitos, CA, vol. 22, No. 7, Jul. 1, 1989, pp. 51-64.

Chu, Y., et al., A top-down parsing co-processor for compilation, System Sciences, 1989, vol. I: Architecture Track, Proceedings, 22nd Annual Hawaii Int'l Conf on Kailua-Kona, HI, USA, Jan. 3-6, 1989, IEEE Comput. Soc. Pr. U.S., Jan. 3, 1998, pp. 403-413, ISBN: 0-8186-1911-2.

* cited by examiner

SYMBOL PARSING ARCHITECTURE

REFERENCE TO RELATED APPLICATIONS

This application is a continuation of commonly-assigned U.S. patent application Ser. No. 11/181,527, filed Jul. 14, 2005, which is a continuation-in-part of commonly-assigned U.S. patent application No. 10/351,030, filed on Jan. 24, 2003 now U.S. Pat. No. 7,130,987, and claims priority from U.S. Provisional Application No. 60/591,978 filed Jul. 28, 2004, both of which are incorporated herein by reference.

FIELD OF THE INVENTION

This invention relates generally to digital processors and processing, and more specifically to digital semantic processors for data processing with a direct execution parser.

BACKGROUND OF THE INVENTION

In the data communications field, a packet is a finite-length (generally several tens to several thousands of octets) digital transmission unit comprising one or more header fields and a data field. The data field may contain virtually any type of digital data. The header fields convey information (in different formats depending on the type of header and options) related to delivery and interpretation of the packet contents. This information may, e.g., identify the packet's source or destination, identify the protocol to be used to interpret the packet, identify the packet's place in a sequence of packets, provide an error correction checksum, or aid packet flow control. The finite length of a packet can vary based on the type of network that the packet is to be transmitted through and the type of application used to present the data.

Typically, packet headers and their functions are arranged in an orderly fashion according to the open-systems interconnection (OSI) reference model. This model partitions packet communications functions into layers, each layer performing specific functions in a manner that can be largely independent of the functions of the other layers. As such, each layer can prepend its own header to a packet, and regard all higher-layer headers as merely part of the data to be transmitted. Layer 1, the physical layer, is concerned with transmission of a bit stream over a physical link. Layer 2, the data link layer, provides mechanisms for the transfer of frames of data across a single physical link, typically using a link-layer header on each frame. Layer 3, the network layer, provides network-wide packet delivery and switching functionality—the well-known Internet Protocol (IP) is a layer 3 protocol. Layer 4, the transport layer, can provide mechanisms for end-to-end delivery of packets, such as end-to-end packet sequencing, flow control, and error recovery—Transmission Control Protocol (TCP), a reliable layer 4 protocol that ensures in-order delivery of an octet stream, and User Datagram Protocol, a simpler layer 4 protocol with no guaranteed delivery, are well-known examples of layer 4 implementations. Layer 5 (the session layer), Layer 6 (the presentation layer), and Layer 7 (the application layer) perform higher-level functions such as communication session management, data formatting, data encryption, and data compression.

Not all packets follow the basic pattern of cascaded headers with a simple payload. For instance, packets can undergo IP fragmentation when transferred through a network and can arrive at a receiver out-of-order. Some protocols, such as the Internet Small Computer Systems Interface (iSCSI) protocol, allow aggregation of multiple headers/data payloads in a single packet and across multiple packets. Since packets are used to transmit secure data over a network, many packets are encrypted before they are sent, which causes some headers to be encrypted as well.

Since these multi-layer packets have a large number of variations, typically, programmable computers are needed to ensure packet processing is performed accurately and effectively. Traditional programmable computers use a von Neumann, or VN, architecture. The VN architecture, in its simplest form, comprises a central processing unit (CPU) and attached memory, usually with some form of input/output to allow useful operations. The VN architecture is attractive, as compared to gate logic, because it can be made "general-purpose" and can be reconfigured relatively quickly; by merely loading a new set of program instructions, the function of a VN machine can be altered to perform even very complex functions, given enough time. The tradeoffs for the flexibility of the VN architecture are complexity and inefficiency. Thus the ability to do almost anything comes at the cost of being able to do a few simple things efficiently.

DESCRIPTION OF THE DRAWINGS

The invention may be best understood by reading the disclosure with reference to the drawings, wherein.

DETAILED DESCRIPTION

The present invention relates to digital semantic processors for data processing with a direct execution parser. Many digital devices either in service or on the near horizon fall into the general category of packet processors. In many such devices, what is done with the data received is straightforward, but the packet protocol and packet processing are too complex to warrant the design of special-purpose hardware. Instead, such devices use a VN machine to implement the protocols.

It is recognized herein that a different and attractive approach exists for packet processors, an approach that can be described more generally as a semantic processor. Such a device is preferably reconfigurable like a VN machine, as its processing depends on its "programming"—although as will be seen this "programming" is unlike conventional machine code used by a VN machine. Whereas a VN machine always executes a set of machine instructions that check for various data conditions sequentially, the semantic processor responds directly to the semantics of an input stream. Semantic processors thus have the ability to process packets more quickly and efficiently than their VN counterparts. The invention is now described in more detail.

Reference will now be made in detail to preferred embodiments of the present invention, examples of which are illustrated in the accompanying drawings. However, the present invention is not limited to the illustrated embodiments, and the illustrated embodiments are introduced to provide easy and complete understanding of the spirit and scope of the present invention.

Figure 1:
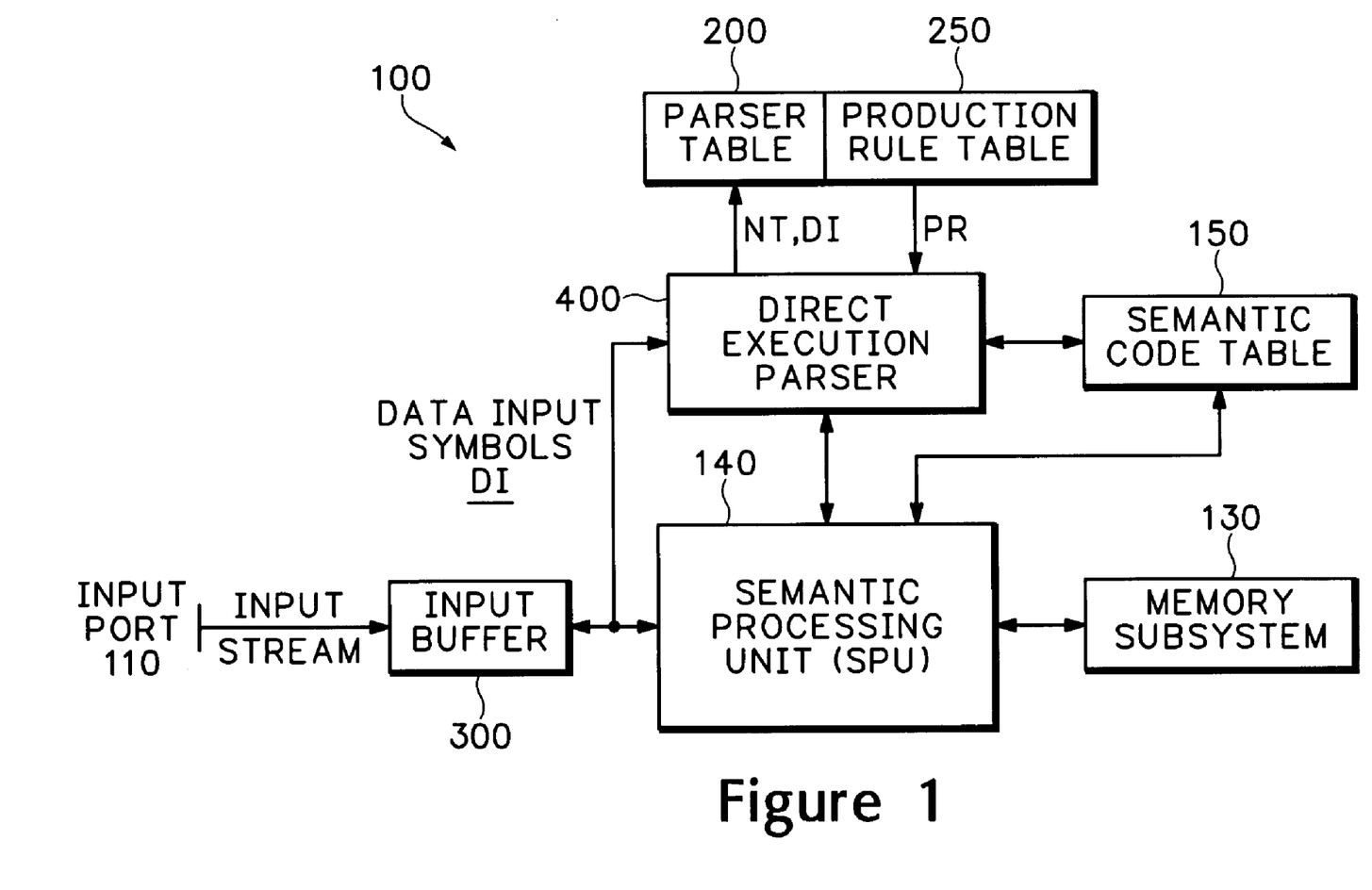
FIG. 1 illustrates, in block form, a semantic processor useful with embodiments of the present invention.

FIG. 1 shows a block diagram of a semantic processor 100 according to an embodiment of the invention. The semantic processor 100 contains an input buffer 300 for buffering a data stream (e.g., the input "stream") received through the input port 110, a direct execution parser (DXP) 400 that controls the processing of packets in the input buffer 300, a semantic processing unit 140 for processing segments of the packets or for performing other operations, and a memory subsystem 130 for storing or augmenting segments of the packets.

The DXP 400 maintains an internal parser stack 430 of non-terminal (and possibly also terminal) symbols, based on parsing of the current input frame or packet up to the current input symbol. When the symbol (or symbols) at the top of the parser stack 430 is a terminal symbol, DXP 400 compares data DI at the head of the input stream to the terminal symbol and expects a match in order to continue. When the symbol at the top of the parser stack 430 is a non-terminal (NT) symbol, DXP 400 uses the non-terminal symbol NT and current input data DI to expand the grammar production on the stack 430. As parsing continues, DXP 400 instructs SPU 140 to process segments of the input, or perform other operations.

Semantic processor 100 uses at least three tables. Code segments for SPU 140 are stored in semantic code table 150. Complex grammatical production rules are stored in a production rule table (PRT) 250. Production rule (PR) codes for retrieving those production rules are stored in a parser table (PT) 200. The PR codes in parser table 200 also allow DXP 400 to detect whether, for a given production rule, a code segment from semantic code table 150 should be loaded and executed by SPU 140.

The production rule (PR) codes in parser table 200 point to production rules in production rule table 250. PR codes are stored, e.g., in a row-column format or a content-addressable format. In a row-column format, the rows of the table are indexed by a non-terminal symbol NT on the top of the internal parser stack 430, and the columns of the table are indexed by an input data value (or values) DI at the head of the input. In a content-addressable format, a concatenation of the non-terminal symbol NT and the input data value (or values) DI can provide the input to the table. Preferably, semantic processor 100 implements a content-addressable format, where DXP 400 concatenates the non-terminal symbol NT with 8 bytes of current input data DI to provide the input to the parser table. Optionally, parser table 200 concatenates the non-terminal symbol NT and 8 bytes of current input data DI received from DXP 400.

Some embodiments of the present invention contain more elements than those shown in FIG. 1. For purposes of understanding the operation of the present invention, however, those elements are peripheral and are omitted from this disclosure.

Figure 2A:
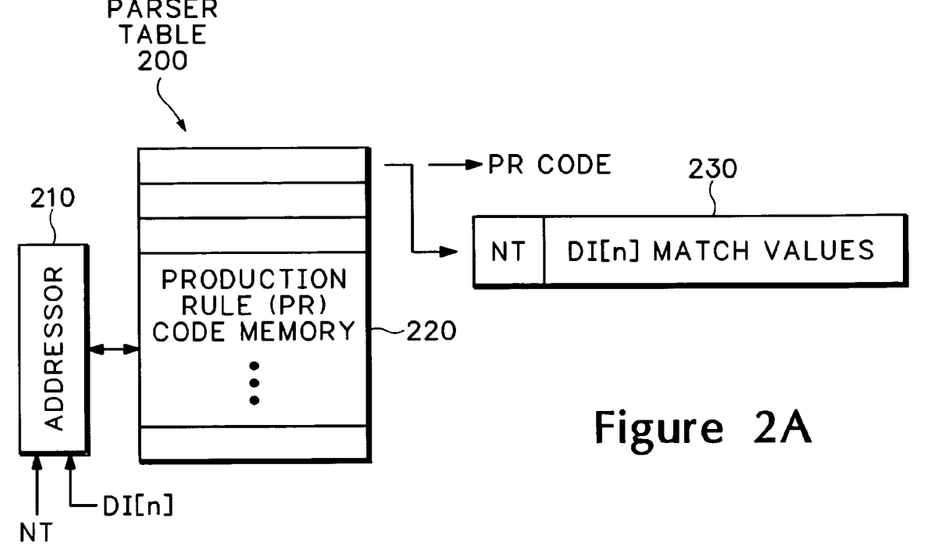
FIG. 2A shows one possible parser table construct useful with embodiments of the invention.

General parser operation for some embodiments of the invention will first be explained with reference to FIGS. 1, 2A, 2B, 3, and 4. FIG. 2A illustrates one possible implementation for a parser table 200. Parser table 200 is comprised of a production rule (PR) code memory 220. PR code memory 220 contains a plurality of PR codes that are used to access a corresponding production rule stored in the production rule table (PRT) 250. Practically, codes for many different grammars can exist at the same time in production rule code memory 220. Unless required by a particular lookup implementation, the input values (e.g., a non-terminal (NT) symbol concatenated with current input values DI[n], where n is a selected match width in bytes) need not be assigned in any particular order in PR code memory 220.

In one embodiment, parser table 200 also includes an addresser 210 that receives an NT symbol and data values DI[n] from DXP 400. Addresser 210 concatenates an NT symbol with the data values DI[n], and applies the concatenated value to PR code memory 220. Optionally, DXP 400 concatenates the NT symbol and data values DI[n] prior to transmitting them to parser table 200.

Although conceptually it is often useful to view the structure of production rule code memory 220 as a matrix with one PR code for each unique combination of NT code and data values, the present invention is not so limited. Different types of memory and memory organization may be appropriate for different applications.

For example, in an embodiment of the invention, the parser table 200 is implemented as a Content Addressable Memory (CAM), where addressor 210 uses an NT code and input data values DI[n] as a key for the CAM to look up the PR code corresponding to a production rule in the PRT 250. Preferably, the CAM is a Ternary CAM (TCAM) populated with TCAM entries. Each TCAM entry comprises an NT code and a DI[n] match value. Each NT code can have multiple TCAM entries. Each bit of the DI[n] match value can be set to "0", "1", or "X" (representing "Don't Care"). This capability allows PR codes to require that only certain bits/bytes of DI[n] match a coded pattern in order for parser table 200 to find a match. For instance, one row of the TCAM can contain an NT code NT_IP for an IP destination address field, followed by four bytes representing an IP destination address corresponding to a device incorporating semantic processor. The remaining four bytes of the TCAM row are set to "don't care." Thus when NT_IP and eight bytes DI[8] are submitted to parser table 200, where the first four bytes of DI[8] contain the correct IP address, a match will occur no matter what the last four bytes of DI[8] contain.

Since, the TCAM employs the "Don't Care" capability and there can be multiple TCAM entries for a single NT, the TCAM can find multiple matching TCAM entries for a given NT code and DI[n] match value. The TCAM prioritizes these matches through its hardware and only outputs the match of the highest priority. Further, when a NT code and a DI[n] match value are submitted to the TCAM, the TCAM attempts to match every TCAM entry with the received NT code and DI[n] match code in parallel. Thus, the TCAM has the ability to determine whether a match was found in parser table 200 in a single clock cycle of semantic processor 100.

Another way of viewing this architecture is as a "variable look-ahead" parser. Although a fixed data input segment, such as eight bytes, is applied to the TCAM, the TCAM coding allows a next production rule to be based on any portion of the current eight bytes of input. If only one bit, or byte, anywhere within the current eight bytes at the head of the input stream, is of interest for the current rule, the TCAM entry can be coded such that the rest are ignored during the match. Essentially, the current "symbol" can be defined for a given production rule as any combination of the 64 bits at the head of the input stream. By intelligent coding, the number of parsing cycles, NT codes, and table entries can generally be reduced for a given parsing task.

The TCAM in parser table 200 produces a PR code corresponding to the TCAM entry 230 matching NT and DI[n], as explained above. The PR code can be sent back to DXP 400, directly to PR table 250, or both. In one embodiment, the PR code is the row index of the TCAM entry producing a match.

When no TCAM entry 230 matched NT and DI[n], several options exist. In one embodiment, the PR code is accompanied by a "valid" bit, which remains unset if no TCAM entry matched the current input. In another embodiment, parser table 200 constructs a default PR code corresponding to the NT supplied to the parser table. The use of a valid bit or default PR code will next be explained in conjunction with FIG. 2B.

Parser table 200 can be located on or off-chip or both, when DXP 400 and SPU 140 are integrated together in a circuit. For instance, static RAM (SRAM) or TCAM located on-chip can serve as parser table 200. Alternately, off-chip DRAM or TCAM storage can store parser table 200, with addressor 210 serving as or communicating with a memory controller for the off-chip memory. In other embodiments, the parser table 200 can be located in off-chip memory, with an on-chip cache capable of holding a section of the parser table 200.

Figure 2B:
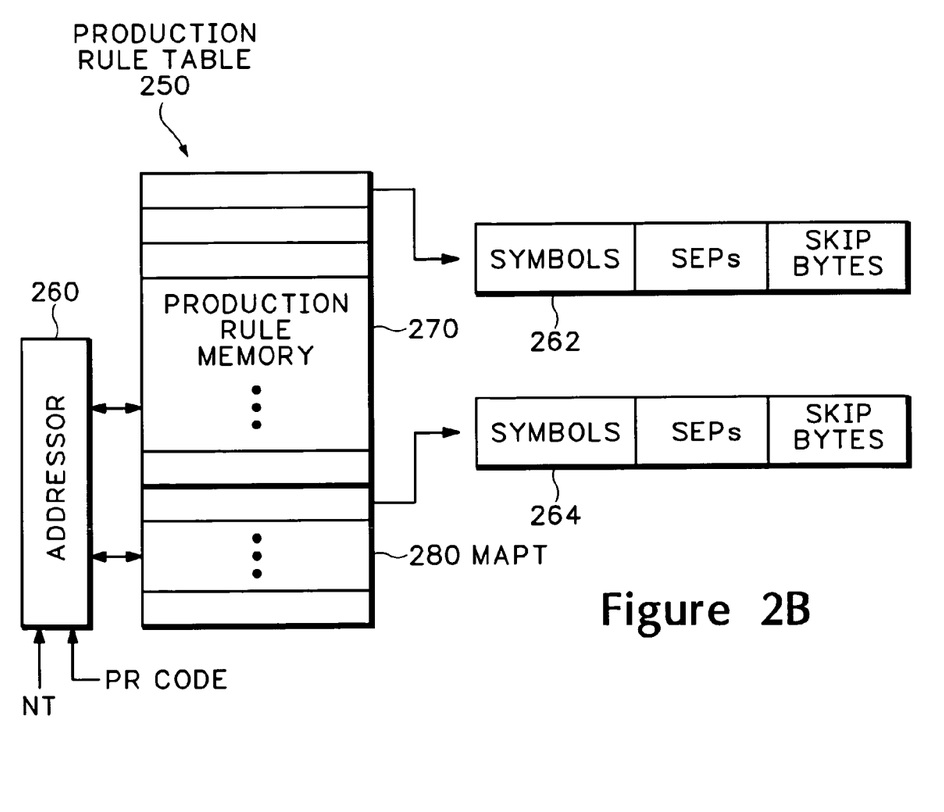
FIG. 2B shows one possible production rule table organization useful with embodiments of the invention.

FIG. 2B illustrates one possible implementation for production rule table 250. PR table 250 comprises a production rule memory 270, a Match All Parser entries Table (MAPT) memory 280, and an addressor 260.

In one embodiment, addressor 260 receives PR codes from either DXP 400 or parser table 200, and receives NT symbols from DXP 400. Preferably, the received NT symbol is the same NT symbol that is sent to parser table 200, where it was used to locate the received PR code. Addressor 260 uses these received PR codes and NT symbols to access corresponding production rules and default production rules, respectively. In a preferred embodiment of the invention, the received PR codes address production rules in production rule memory 270 and the received NT codes address default production rules in MAPT 280. Addressor 260 may not be necessary in some implementations, but when used, can be part of DXP 400, part of PRT 250, or an intermediate functional block. An addressor may not be needed, for instance, if parser table 200 or DXP 400 constructs addresses directly.

Figure 4:
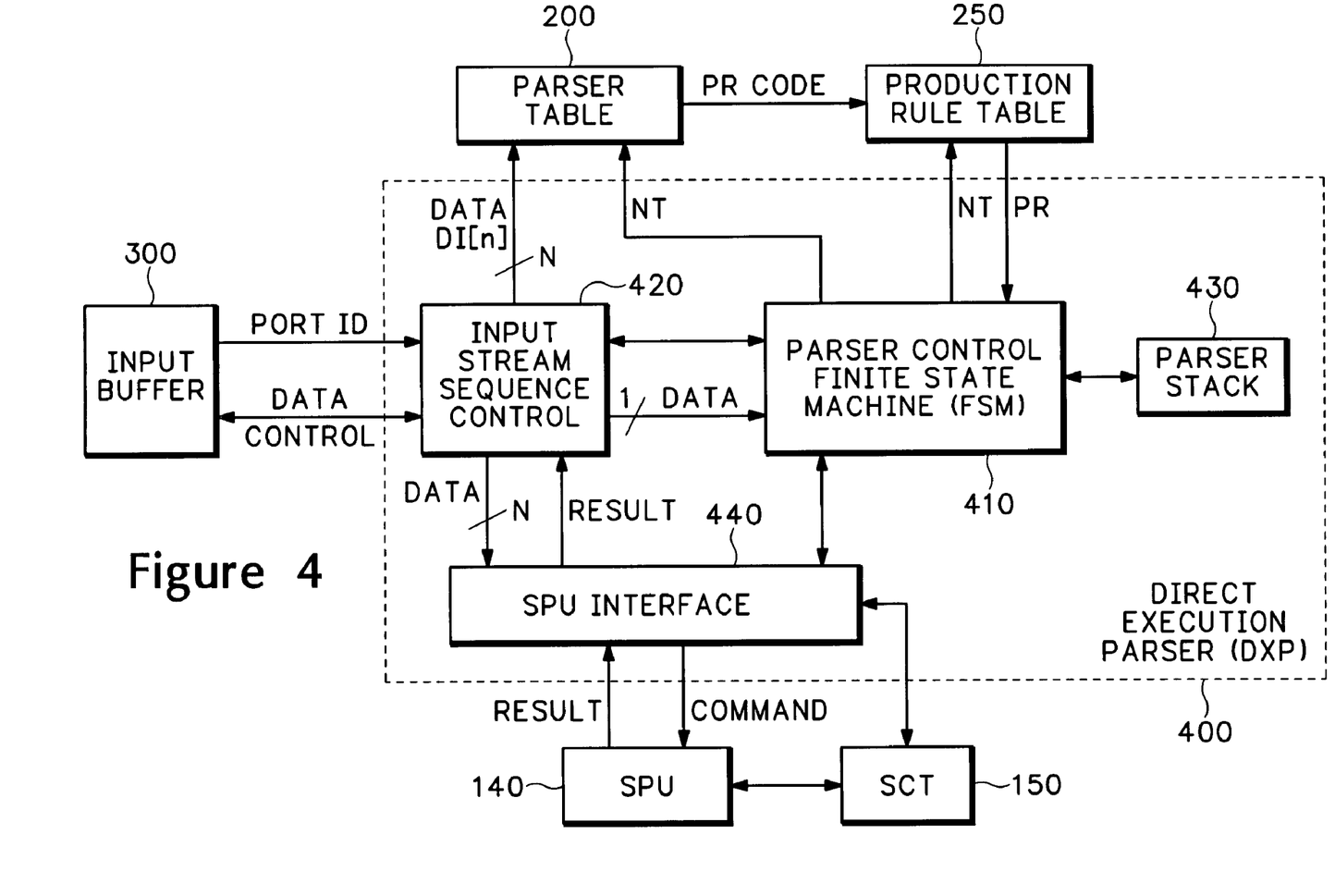
FIG. 4 illustrates, in block form, one implementation for a direct execution parser (DXP) useful with embodiments of the present invention.

Production rule memory 270 stores the production rules 262 containing three data segments. These data segments include: a symbol segment, a SPU entry point (SEP) segment, and a skip bytes segment. These segments can either be fixed length segments or variable length segments that are, preferably, null-terminated. The symbol segment contains terminal and/or non-terminal symbols to be pushed onto the DXP's parser stack 430 (FIG. 4). The SEP segment contains SPU entry points (SEP) used by the SPU 140 in processing segments of data. The skip bytes segment contains skip bytes data used by the input buffer 300 to increment its buffer pointer and advance the processing of the input stream. Other information useful in processing production rules can also be stored as part of production rule 262.

MAPT 280 stores default production rules 264, which in this embodiment have the same structure as the PRs in production rule memory 270, and are accessed when a PR code cannot be located during the parser table lookup.

Although production rule memory 270 and MAPT 280 are shown as two separate memory blocks, the present invention is not so limited. In a preferred embodiment of the invention, production rule memory 270 and MAPT 280 are implemented as on-chip SRAM, where each production rule and default production rule contains multiple null-terminated segments.

As production rules and default production rules can have various lengths, it is preferable to take an approach that allows easy indexing into their respective memories 270 and 280. In one approach, each PR has a fixed length that can accommodate a fixed maximum number of symbols, SEPs, and auxiliary data such as the skip bytes field. When a given PR does not need the maximum number of symbols or SEPs allowed for, the sequence can be terminated with a NULL symbol or SEP. When a given PR would require more than the maximum number, it can be split into two PRs, accessed, e.g., by having the first issue a skip bytes value of zero and pushing an NT onto the stack that causes the second to be accessed on the following parsing cycle. In this approach, a one-to-one correspondence between TCAM entries and PR table entries can be maintained, such that the row address obtained from the TCAM is also the row address of the corresponding production rule in PR table 250.

The MAPT 280 section of PRT 250 can be similarly indexed, but using NT codes instead of PR codes. For instance, when a valid bit on the PR code is unset, addressor 260 can select as a PR table address the row corresponding to the current NT. For instance, if 256 NTs are allowed, MAPT 280 could contain 256 entries, each indexed to one of the NTs. When parser table 200 has no entry corresponding to a current NT and data input DI[n], the corresponding default production rule from MAPT 280 is accessed.

Taking the IP destination address again as an example, the parser table can be configured, e.g., to respond to one of two expected destination addresses during the appropriate parsing cycle. For all other destination addresses, no parser table entry would be found. Addressor 260 would then look up the default rule for the current NT, which would direct the DXP 40 and/or SPU 140 to flush the current packet as a packet of no interest.

Although the above production rule table indexing approach provides relatively straightforward and rapid rule access, other indexing schemes are possible. For variable-length PR table entries, the PR code could be arithmetically manipulated to determine a production rule's physical memory starting address (this would be possible, for instance, if the production rules were sorted by expanded length, and then PR codes were assigned according to a rule's sorted position). In another approach, an intermediate pointer table can be used to determine the address of the production rule in PRT 250 from the PR code or the default production rule in MAPT 280 from the NT symbol.

Figure 3:
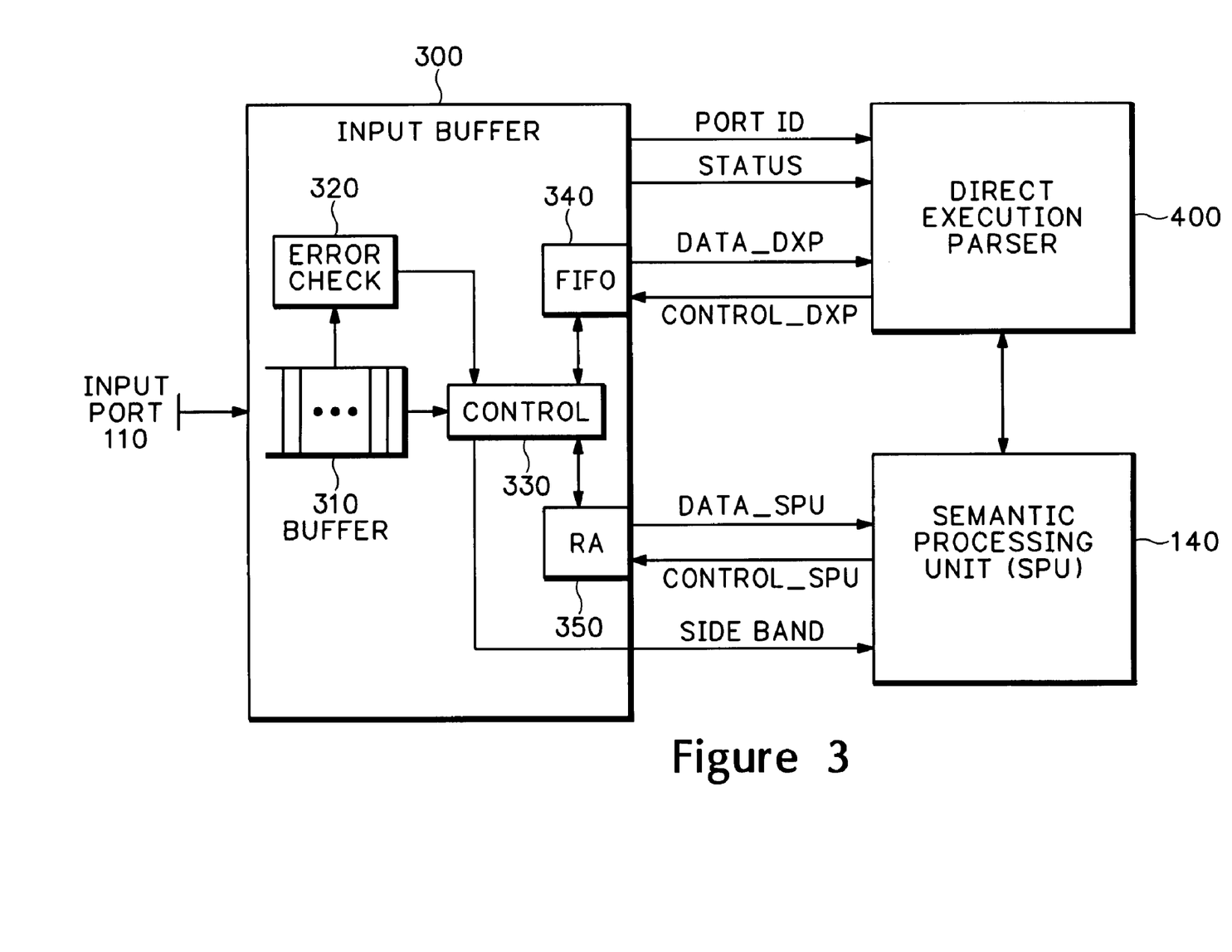
FIG. 3 illustrates, in block form, one implementation for an input buffer useful with embodiments of the present invention.

The use of the symbols, SEPs, and skip bytes values from a production rule 262 or 264 will be explained further below, after one additional functional unit, the input buffer 300, is explained in further detail.

FIG. 3 illustrates one possible implementation for input buffer 300 useful with embodiments of the invention. Input buffer 300 is comprised of: a buffer 310 that receives data through input port 110; a control block 330 for controlling the data in buffer 310; an error check (EC) block 320 for checking the received data for transmission errors; a FIFO block 340 to allow DXP 400 FIFO access to data in buffer 310, and a random access (RA) block 350 to allow SPU 140 random access to the data in buffer 310. Preferably, EC block 320 determines if a received data frame or packet contains errors by checking for inter-packet gap (IPG) violations and Ethernet header errors, and by computing the Cyclic Redundancy Codes (CRC).

When a packet, frame, or other new data segment is received at buffer 310 through input port 110, input buffer 300 transmits a Port ID to DXP 400, alerting DXP 400 that new data has arrived. EC block 320 checks the new data for errors and sets status bits that are sent to DXP 400 in a Status signal. When DXP 400 decides to parse through the headers of a received data segment, it sends a Control_DXP signal to input buffer 300 asking for a certain amount of data from buffer 310, or requesting that buffer 310 increment its data head pointer without sending data to DXP 400. Upon receipt of a Control_DXP signal, control block 330 transmits a Data_DXP signal, containing data from buffer 310 (if requested), to DXP 400 through FIFO block 340. In an embodiment of the invention, the control block 330 and FIFO block 340 add control characters into the data segment as it is sent to DXP 400 in the Data_DXP signal. Preferably, the control characters include 1-bit status flags that are added at the beginning of each byte of data transferred and denote whether the subsequent byte of data is a terminal or non-terminal symbol. The control characters can also include special non-terminal symbols, e.g., start-of-packet, end-of-packet, port_ID, etc.

When SPU 140 receives a SPU entry point (SEP) from DXP 400 that requires SPU 140 to access data within the input buffer data, the SPU 140 sends a Control_SPU signal to input buffer 300 requesting the data at a certain location in buffer 310. Upon receipt of the Control_SPU signal, control block 330 transmits a Sideband signal to SPU 140 and subsequently transmits a Data_SPU signal, containing data from buffer 310, to SPU 140 through RA block 350. The Sideband signal, preferably, indicates how many bytes of data being sent are valid and if there is error in the data stream. In an embodiment of the invention, the control block 330 and RA block 350 add control characters into the data stream as it is sent to SPU 140. Preferably, the control characters include appending a computed CRC value and error flag, when necessary, to the end of a packet or frame in the data stream.

FIG. 4 shows one possible block implementation for DXP 400. Parser control finite state machine (FSM) 410 controls and sequences overall DXP 400 operation, based on inputs from the other logical blocks in FIG. 4. Parser stack 430 stores the symbols to be executed by DXP 400. Input stream sequence control 420 retrieves input data values from input buffer 300, to be processed by DXP 400. SPU interface 440 dispatches tasks to SPU 140 on behalf of DXP 400. The particular functions of these blocks will be further described below.

The basic operation of the blocks in FIGS. 1-4 will now be described with reference to the flowchart for data stream parsing in FIG. 5. The flowchart 500 is used for illustrating a method embodiment of the invention.

According to a block 510, semantic processor 100 waits for a packet to be received at input buffer 300 through input port 110.

The next decision block 512 determines whether a packet was received in block 510. If a packet has not yet been received, processing returns to block 510 where semantic processor 100 waits for a packet to be received. If a packet has been received at input buffer 300, according to a next block 520, input buffer 300 sends a Port ID signal to DXP 400, where it is pushed onto parser stack 430 as a NT symbol. The Port ID signal alerts DXP 400 that a packet has arrived at input buffer 300. In a preferred embodiment of the invention, the Port ID signal is received by the input stream sequence control 420 and transferred to FSM 410, where it is pushed onto parser stack 430. Preferably, a 1-bit status flag, preceding or sent in parallel with the Port ID, denotes the Port ID as an NT symbol.

According to a next block 530, DXP 400, after determining that the symbol on the top of parser stack 430 is not the bottom-of-stack symbol and that the DXP is not waiting for further input, requests and receives N bytes of input stream data from input buffer 300. DXP 400 requests and receives the data through a DATA/CONTROL signal coupled between the input stream sequence control 420 and input buffer 300.

The next decision block 532 determines whether the symbol on the parser stack 430 is a terminal (T) or a NT symbol. This determination is preferably performed by FSM 410 reading the status flag of the symbol on parser stack 430.

When the symbol is determined to be a terminal symbol, according to a next block 540, DXP 400 checks for a match between the T symbol and the next byte of data from the received N bytes. FSM 410 checks for a match by comparing the next byte of data received by input stream sequence control 420 to the T symbol on parser stack 430. After the check is completed, FSM 410 pops the T symbol off of the parser stack 430, preferably by decrementing the stack pointer.

The next decision block 542 determines whether there was a match between the T symbol and the next byte of data. If a match is made, execution returns to block 530, where DXP 400, after determining that the symbol on the parser stack 430 is not the bottom-of-stack symbol and that it is not waiting for further input, requests and receives additional input stream data from input buffer 300. In a preferred embodiment of the invention, DXP 400 would only request and receive one byte of input stream data after a T symbol match was made, to refill the DI buffer since one input symbol was consumed.

When a match was not made, the remainder of the current data segment may be assumed in some circumstances to be unparseable. According to a next block 550, DXP 400 resets parser stack 430 and launches a SEP to remove the remainder of the current packet from the input buffer 300. In an embodiment of the invention, FSM 410 resets parser stack 430 by popping off the remaining symbols, or preferably by setting the top-of-stack pointer to point to the bottom-of-stack symbol. DXP 400 launches a SEP by sending a command to SPU 140 through SPU interface 440. This command requires that SPU 140 load microinstructions from SCT 150, that when executed, enable SPU 140 to remove the remainder of the unparseable data segment from the input buffer 300. Execution then returns to block 510.

It is noted that not every instance of unparseable input in the data stream may result in abandoning parsing of the current data segment. For instance, the parser may be configured to handle ordinary header options directly with grammar. Other, less common or difficult header options could be dealt with using a default grammar rule that passes the header options to a SPU for parsing.

When the symbol in decision block 532 is determined to be an NT symbol, according to a next block 560, DXP 400 sends the NT symbol from parser stack 430 and the received N bytes DI[N] in input stream sequence control 420 to parser table 200, where parser table 200 checks for a match, e.g., as previously described. In the illustrated embodiment, parser table 200 concatenates the NT symbol and the received N bytes. Optionally, the NT symbol and the received N bytes can be concatenated prior to being sent to parser table 200. Preferably, the received N bytes are concurrently sent to both SPU interface 440 and parser table 200, and the NT symbol is concurrently sent to both the parser table 200 and the PRT 250. After the check is completed, FSM 410 pops the NT symbol off of the parser stack 430, preferably by decrementing the stack pointer.

The next decision block 562 determines whether there was a match in the parser table 200 to the NT symbol concatenated with the N bytes of data. If a match is made, according to a next block 570, the parser table 200 returns a PR code to PRT 250 corresponding to the match, where the PR code addresses a production rule within PRT 250. Optionally, the PR code is sent from parser table 200 to PRT 250, through DXP 400. Execution then continues at block 590.

When a match is not made, according to a next block 580, DXP 400 uses the received NT symbol to look up a default production rule in the PRT 250. In a preferred embodiment, the default production rule is looked up in the MAPT 280 memory located within PRT 250. Optionally, MAPT 280 memory can be located in a memory block other than PRT 250.

In a preferred embodiment of the invention, when PRT 250 receives a PR code, it only returns a PR to DXP 400, corresponding either to a found production rule or a default production rule. Optionally, a PR and a default PR can both be returned to DXP 400, with DXP 400 determining which will be used.

According to a next block 590, DXP 400 processes the rule received from PRT 250. The rule received by DXP 400 can either be a production rule or a default production rule. In an embodiment of the invention, FSM 410 divides the rule into three segments, a symbol segment, SEP segment, and a skip bytes segment. Preferably, each segment of the rule is fixed length or null-terminated to enable easy and accurate division.

In the illustrated embodiment, FSM 410 pushes T and/or NT symbols, contained in the symbol segment of the production rule, onto parser stack 430. FSM 410 sends the SEPs contained in the SEP segment of the production rule to SPU interface 440. Each SEP contains an address to microinstructions located in SCT 150. Upon receipt of the SEPs, SPU interface 440 allocates SPU 140 to fetch and execute the microinstructions pointed to by the SEP. SPU interface 440 also sends the current DI[N] value to SPU 140, as in many situations the task to be completed by the SPU will need no further input data. Optionally, SPU interface 440 fetches the microinstructions to be executed by SPU 140, and sends them to SPU 140 concurrent with its allocation. FSM 410 sends the skip bytes segment of the production rule to input buffer 300 through input stream sequence control 420. Input buffer 300 uses the skip bytes data to increment its buffer pointer, pointing to a location in the input stream. Each parsing cycle can accordingly consume any number of input symbols between 0 and 8.

After DXP 400 processes the rule received from PRT 250, the next decision block 592 determines whether the next symbol on the parser stack 430 is a bottom-of-stack symbol. If the next symbol is a bottom-of-stack symbol, execution returns to block 510, where semantic processor 100 waits for a new packet to be received at input buffer 300 through input port 110.

When the next symbol is not a bottom-of-stack symbol, the next decision block 594 determines whether DXP 400 is waiting for further input before it begins processing the next symbol on parser stack 430. In the illustrated embodiment, DXP 400 could wait for SPU 140 to begin processing segments of the input stream, SPU 140 to return processing result data, etc.

When DXP 400 is not waiting for further input, execution returns to block 530, where DXP 400 requests and receives input stream data from input buffer 300. When DXP 400 is waiting for further input, execution returns to block 594 until the input is received.

Figure 6:
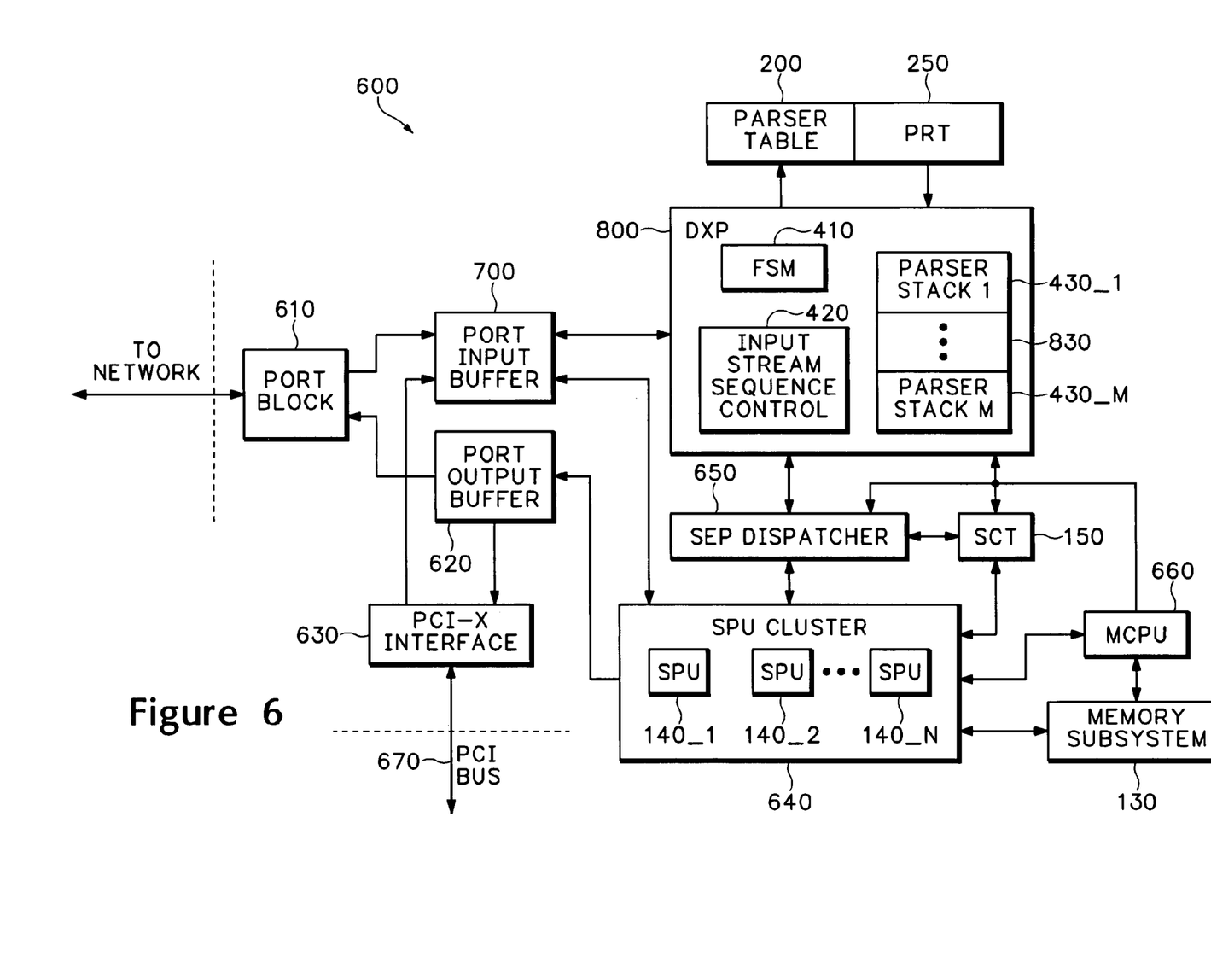
FIG. 6 illustrates yet another semantic processor implementation useful with embodiments of the present invention.

FIG. 6 shows yet another semantic processor embodiment. Semantic processor 600 contains a semantic processing unit (SPU) cluster 640 containing a plurality of semantic processing units (SPUs) 140-1 to 140-N. Preferably, each of the SPUs 140-1 to 140-N are identical and have the same functionality. SPU cluster 640 is coupled to the memory subsystem 130, a SPU entry point (SEP) dispatcher 650, the SCT 150, a port input buffer (PIB) 700, a port output buffer (POB) 620, and a machine central processing unit (MCPU) 660.

When DXP 800 determines that a SPU task is to be launched at a specific point in parsing, DXP 800 signals SEP dispatcher 650 to load microinstructions from semantic code table (SCT) 150 and allocate a SPU from the plurality of SPUs 140-1 to 140-N within the SPU cluster 640 to perform the task. The loaded microinstructions indicate the task to be performed and are sent to the allocated SPU. The allocated SPU then executes the microinstructions and the data in the input stream is processed accordingly. The SPU can optionally load microinstructions from the SCT 150 directly when instructed by the SEP dispatcher 650.

Figure 7:
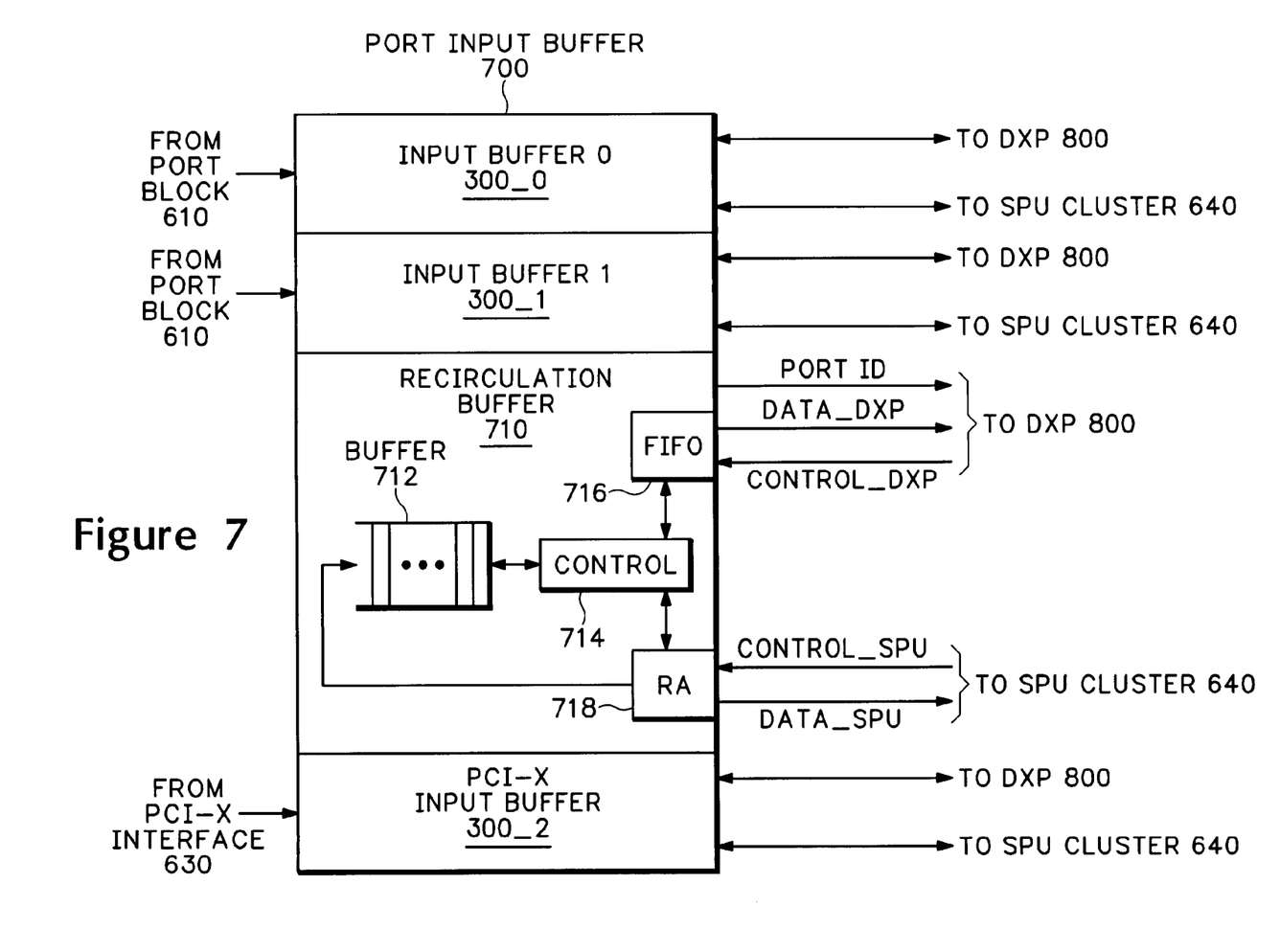
FIG. 7 illustrates, in block form, one implementation for port input buffer (PIB) useful with embodiments of the present invention.

Referring to FIG. 7 for further detail, PIB 700 contains at least one network interface input buffer 300 (300-0 and 300-1 are shown), a recirculation buffer 710, and a Peripheral Component Interconnect (PCI-X) input buffer 300_2. POB 620 contains (not shown) at least one network interface output buffer and a PCI-X output buffer. The port block 610 contains one or more ports, each comprising a physical interface, e.g., an optical, electrical, or radio frequency driver/receiver pair for an Ethernet, Fibre Channel, 802.11x, Universal Serial Bus, Firewire, SONET, or other physical layer interface. Preferably, the number of ports within port block 610 corresponds to the number of network interface input buffers within PIB 700 and the number of output buffers within POB 620.

Referring back to FIG. 6, PCI-X interface 630 is coupled to the PCI-X input buffer within PIB 700, the PCI-X output buffer within POB 620, and an external PCI bus 670. The PCI bus 670 can connect to other PCI-capable components, such as disk drives, interfaces for additional network ports, etc.

The MCPU 660 is coupled with the SPU cluster 640 and memory subsystem 130. MCPU 660 performs any desired functions for semantic processor 600 that can reasonably be accomplished with traditional software. These functions are usually infrequent, non-time-critical functions that do not warrant inclusion in SCT 150 due to code complexity. Preferably, MCPU 660 also has the capability to communicate with SEP dispatcher 650 in order to request that a SPU perform tasks on the MCPU's behalf.

FIG. 7 illustrates one possible implementation for port input buffer (PIB) 700 useful with embodiments of the invention. The PIB 700 contains two network interface input buffers 300_0 and 300_1, a recirculation buffer 710, and a PCI-X input buffer 300_2. Input buffer 300_0 and 300_1, and PCI-X input buffer 300_2 are functionally the same as input buffer 300, but they receive input data from a different input to port block 610 and PCI-X interface 630, respectively.

Recirculation buffer 710 is comprised of a buffer 712 that receives recirculation data from SPU Cluster 640, a control block 714 for controlling the recirculation data in buffer 712, a FIFO block 716 to allow a DXP 800 (FIG. 8) FIFO access to the recirculation data in buffer 712, and a random access (RA) block 718 to allows a SPU within SPU Cluster 640 random access to the recirculation data in buffer 712. When the recirculation data is received at buffer 712 from SPU Cluster 640, recirculation buffer 710 transmits a Port ID to DXP 800, alerting DXP 800 that new data has arrived. Preferably, the Port ID that is transmitted is the first symbol within buffer 712.

When DXP 800 decides to parse through the recirculation data, it sends a Control_DXP signal to recirculation buffer 710 asking for a certain amount of data from buffer 712, or to increment buffer's 712 data pointer. Upon receipt of a Control_DXP signal, control block 714 transmits a Data_DXP signal, containing data from buffer 712, to DXP 800 through FIFO block 716. In an embodiment of the invention, the control block 714 and FIFO block 716 add control characters into the recirculation data that is sent to DXP 800 using the Data_DXP signal. Preferably, the control characters are 1-bit status flags that are added at the beginning of each byte of data transferred and denote whether the byte of data is a terminal or non-terminal symbol.

When a SPU 140 within SPU cluster 640 receives a SPU entry point (SEP) from DXP 800 that requires it to access data within the recirculation stream, the SPU 140 sends a Control_SPU signal to recirculation buffer 710 requesting the data at a certain location from buffer 712. Upon receipt of a Control_SPU signal, control block 714 transmits a Data_SPU signal, containing data from buffer 712, to SPU 140 through RA block 718.

Figure 8:
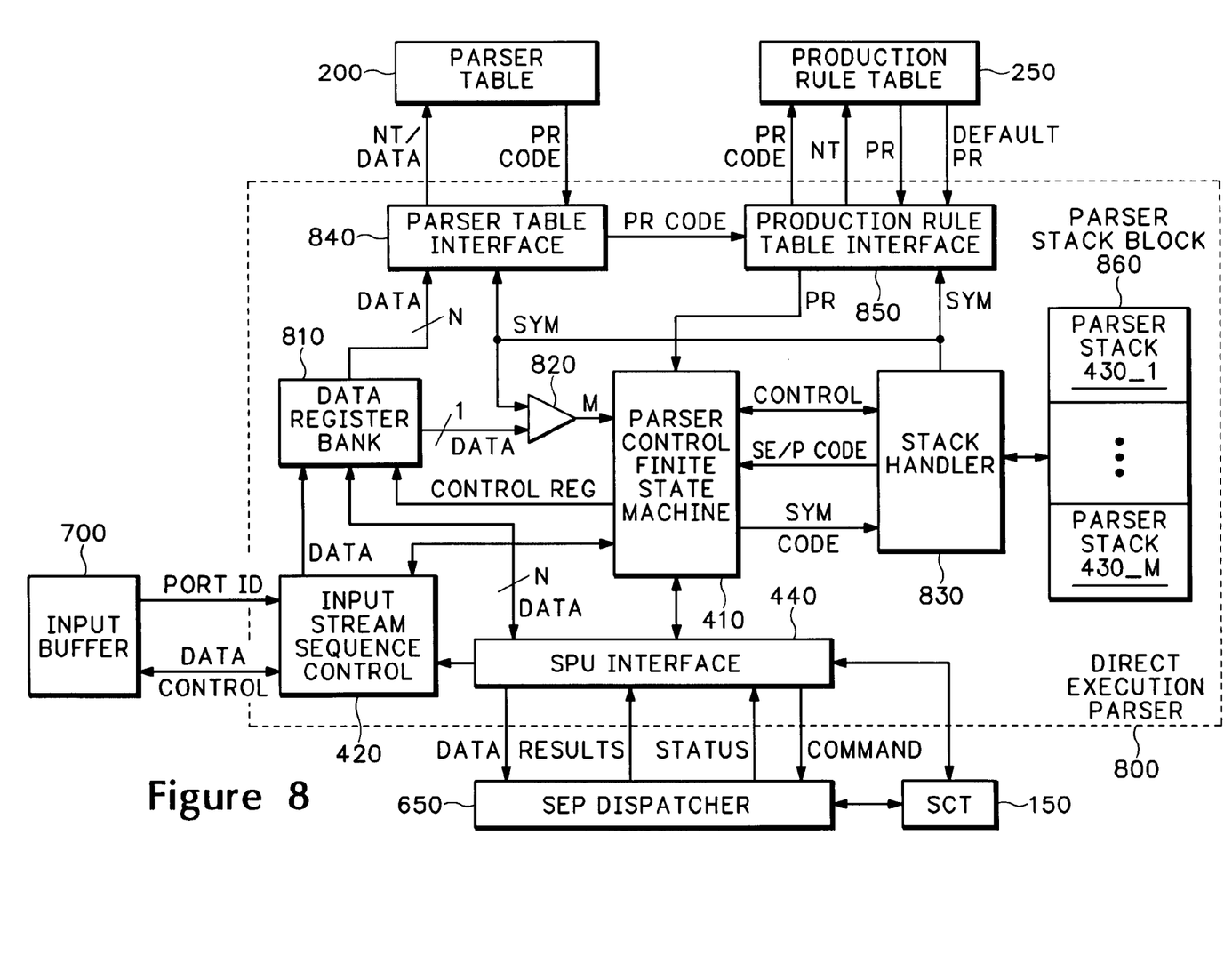
FIG. 8 illustrates, in block form, another implementation for a direct execution parser (DXP) useful with embodiments of the present invention.

FIG. 8 shows one possible block implementation for DXP 800. Parser control finite state machine (FSM) 410 controls and sequences overall DXP 800 operation, based on inputs from the other logical blocks in FIG. 8, in similar fashion to that described for DXP 400 illustrated in FIG. 4. Differences exist, however, due to the existence of multiple parsing inputs in input buffer 700. These differences largely lie within the parser control FSM 410, the stack handler 830, and the input stream sequence control 420. Additionally, parser stack 430 of FIG. 4 has been replaced with a parser stack block 860 capable of maintaining a plurality of parser stacks 430_1 to 430_M. Finally, a parser data register bank 810 has been added.

Stack handler 830 controls the plurality of parser stacks 430_1 to 430_M, by storing and sequencing the symbols to be executed by DXP 800. In an embodiment of the invention, parser stacks 430_1 to 430_M are located in a single memory, where each parser stack is allocated a fixed portion of that memory. Alternately, the number of parser stacks 430_1 to 430_M within a parser stack block 860 and the size of each parser stack can be dynamically determined and altered by stack handler 830 as dictated by the number of active input data ports and the grammar.

DXP 800 receives inputs through a plurality of interface blocks, including: parser table interface 840, production rule table (PRT) interface 850, input stream sequence control 420 and SPU interface 440. Generally, these interfaces function as previously described, with the exception of input stream sequence control 420.

Input stream sequence control 420 and data register bank 810 retrieve and hold input stream data from PIB 700. Data register bank 810 is comprised of a plurality of registers that can store received input stream data. Preferably, the number of registers is equal to the maximum number of parser stacks 430_1 to 430_M that can exist within parser stack block 860, each register capable of holding N input symbols.

Parser control FSM 410 controls input stream sequence control 420, data register bank 810, and stack handler 830 to switch parsing contexts between the different input buffers. For instance, parser control FSM 410 maintains a context state that indicates whether it is currently working with data from input buffer 300_0, input buffer 300_1 PCI-X input buffer 3002, or recirculation buffer 710. This context state is communicated to input stream sequence control 420, causing it to respond to data input or skip commands in the grammar with commands to the appropriate input or recirculation buffer. The context state is also communicated to the data register bank 810, causing loads and reads of that register to access a register corresponding to the current context state. Finally, the context state is communicated to the stack handler 830, causing pushes and pop commands to stack handler 830 to access the correct one of the parser stacks 430_1 to 430_M.

Parser control FSM decides when to switch parsing contexts. For instance, when a bottom-of-stack symbol is reached on a particular parser stack, or when a particular parser context stalls due to a SPU operation, parser control FSM can examine the state of the next parsing context, and continue in round-robin fashion until a parsing context that is ready for parsing is reached.

The basic operation of the blocks in FIGS. 2A, 2B, and 6-8 will now be described with reference to the flowchart for data parsing in FIG. 9. The flowchart 900 is used for illustrating a method according to an embodiment of the invention.

According to a decision block 905, DXP 800 determines whether new data, other than data corresponding to a stalled parser stack, has been received at PIB 700. In an embodiment of the invention, the four buffers within PIB 700 each have a unique Port ID, which is sent to DXP 800 when new data is received. Preferably, recirculation buffer 710 contains its unique Port ID as the first byte in each recirculation data segment. Since the four buffers within PIB 700 each have an independent input, DXP 800 can receive multiple Port IDs simultaneously. When DXP 800 receives multiple Port IDs it, preferably uses round robin arbitration to determine the sequence in which it will parse the new data present at the ports.

In one embodiment of the invention, parser stacks can be saved by DXP 800 when parsing has to halt on a particular stream. A parser stack is saved when FSM 410 sends a Control signal to stack handler 830 commanding it to switch the selection of parser stacks.

When new data has not yet been received, processing returns to block 905, where DXP 800 waits for new data to be received by PIB 700.

When new data has been received, according to a next block 910, DXP 800 pushes the Port ID of the selected buffer onto the selected parser stack as an NT symbol, where the selected buffer is the buffer within PIB 700 that DXP 800 selected to parse, and the selected parser stack within DXP 800 is the parser stack that DXP 800 selected to store symbols to be executed. The grammar loaded for each port, or a portion of that grammar, can be different depending on the initial non-terminal symbol loaded for that port. For example, if one input port receives SONET frames and another input port receives Ethernet frames, the Port ID NT symbols for the respective ports can be used to automatically select the proper grammar for each port.

In an embodiment of the invention, input stream sequence control 420 selects a buffer within PIB 700 through round robin arbitration, and stack handler 830 selects a parser stack within parser stack block 860. In a preferred embodiment of the invention, FSM 410 sends a signal to input stream sequence control 420 to enable selection of a buffer within PIB 700, and a Control Reg signal to data register bank 810 to select a register. Also, FSM 410 sends a Control signal to stack handler 830 to enable selection of a buffer or to dynamically allocate a parser stack in parser stack block 860.

For illustrative purposes, it is assumed that input buffer 300_0 had its Port ID selected by DXP 800 and that parser stack 430_1 is selected for storing the grammar symbols to be used by DXP 800 in parsing data from input buffer 300_0. In the illustrated embodiment of the invention, the Port ID is pushed onto parser stack 430_1 by stack handler 830, after stack handler 830 receives the Port ID and a Push command from FSM 410 in SYM Code and Control signals, respectively. A 1-bit status flag, preceding the Port ID, denotes the Port ID as a NT symbol.

According to a next block 920, DXP 800 requests and receives N bytes of data (or a portion thereof) from the stream within the selected buffer. In the illustrated embodiment, DXP 800 requests and receives the N bytes of data through a DATA/CONTROL signal coupled between the input stream sequence control 420 and input buffer 300_0 within PIB 700. After the data is received by the input stream sequence control 420, it is stored to a selected register within data register control 810, where the selected register within data register control 810 is controlled by the current parsing context.

According to a next block 930, DXP 800, after determining that it is not waiting for further input and that the symbol on the selected parser stack is not the bottom-of-stack symbol, processes the symbol on the top of the selected parser stack and the received N bytes (or a portion thereof). Block 930 includes a determination of whether the top symbol is a terminal or a non-terminal symbol. This determination can be performed by stack handler 830, preferably by reading the status flag of the symbol on the top of parser stack 430_1, and sending that status to FSM 410 as a prefix (P) code signal.

When the symbol is determined to be a terminal (T) symbol, at decision block 935 DXP 800 checks for a match between the T symbol and the next byte of data from the received N bytes.

In a preferred embodiment of the invention, a match signal M, used by DXP 400 to check whether a T symbol match has been made, is sent to FSM 410 by comparator 820 when comparator 820 is inputted with the T symbol from stack handler 830 and next byte of data from the selected register within data register control 810. Stack handler 830 sends the T symbol on parser stack 430_1 to the input of comparator 820, by popping the symbol off of parser stack 430_1.

When the symbol on the top of the current parser stack is determined to be a non-terminal (NT) symbol, at block 945 DXP 800 sends the NT symbol from parser stack 430_1 and the received N bytes in the selected register from bank 810 to the parser table 200. In the illustrated embodiment, the NT symbol and the received N bytes are sent to parser table interface 840, where they are concatenated prior to being sent to parser table 200. Optionally, the NT symbol and the received N bytes can be sent directly to parser table 200. In some embodiments, the received N bytes in the selected register are concurrently sent to SPU 140 and parser table 200.

Preferably, the symbol on the parser stack 430_1 is sent to comparator 820, parser table interface 450 and PRT interface 460 concurrently.

Assuming that a valid block 935 T-symbol match was attempted, when that match is successful, execution returns to block 920, where DXP 800 requests and receives up to N bytes of additional data from the PIB 700. In one embodiment of the invention, DXP 800 would only request and receive one byte of stream data after a T symbol match was made.

When a block 935 match is attempted and unsuccessful, according to a next block 940, DXP 800 may, when the grammar directs, clear the selected parser stack and launches a SEP to remove the remainder of the current data segment from the current input buffer. DXP 800 resets parser stack 430_1 by sending a control signal to stack handler 830 to pop the remaining symbols and set the stack pointer to the bottom-of-stack symbol. DXP 800 launches a SEP by sending a command to SPU dispatcher 650 through SPU interface 440, where SPU dispatcher 650 allocates a SPU 140 to fetch microinstructions from SCT 150. The microinstructions, when executed, remove the remainder of the current data segment from input buffer 300_0. Execution then returns to block 905, where DXP 800 determines whether new data, for a data input other than one with a stalled parser context, has been received at PIB 700.

Assuming that the top-of-stack symbol was a non-terminal symbol, a block 945 match is attempted instead of a block 935 match. When there was a match in the parser table 200 to the NT symbol concatenated with the N bytes of data, execution proceeds to block 950. The parser table 200 returns a PR code corresponding to the match to DXP 800, and DXP 800 uses the PR code to look up a production rule in PRT 250. In one embodiment, the production rule is looked up in the PRT memory 270 located within PRT 250.

In the illustrated embodiment, the PR code is sent from parser table 200 to PRT 250, through intermediate parser table interface 450 and PRT interface 460. Optionally, the PR code can be sent directly from parser table 200 to PRT 250.

When a match is unsuccessful in decision block 945, according to a next block 960, DXP 800 uses the NT symbol from the selected parser stack to look up a default production rule in PRT 250. In one embodiment, the default production rule is looked up in the MAPT 280 memory located within PRT 250. Optionally, MAPT 280 memory can be located in a memory block other than PRT 250.

In the illustrated embodiment, stack handler 830 sends production rule interface 850 and parser table interface 840 the NT symbol at the same time. Optionally, stack handler 830 could send the NT symbol directly to parser table 200 and PRT 250. When PRT 250 receives a PR code and an NT symbol, it sends both a production rule and a default production rule to PRT interface 850, concurrently. Production rule interface 480 only returns the appropriate rule to FSM 410. In another embodiment, both the production rule and default production rule are sent to FSM 410. In yet another embodiment, PRT 250 only sends PRT interface 850 one of the PR or default PR, depending on if a PR code was sent to PRT 250.

Whether block 950 or block 960 was executed, both proceed to a next block 970. According to block 970, DXP 800 processes the received production rule from PRT 250. In an embodiment of the invention, FSM 410 divides the production rule into three segments, a symbol segment, SEP segment, and a skip bytes segment. Preferably, each segment of the production rule is fixed length or null-terminated to enable easy and accurate division, as described previously.

Figure 5:
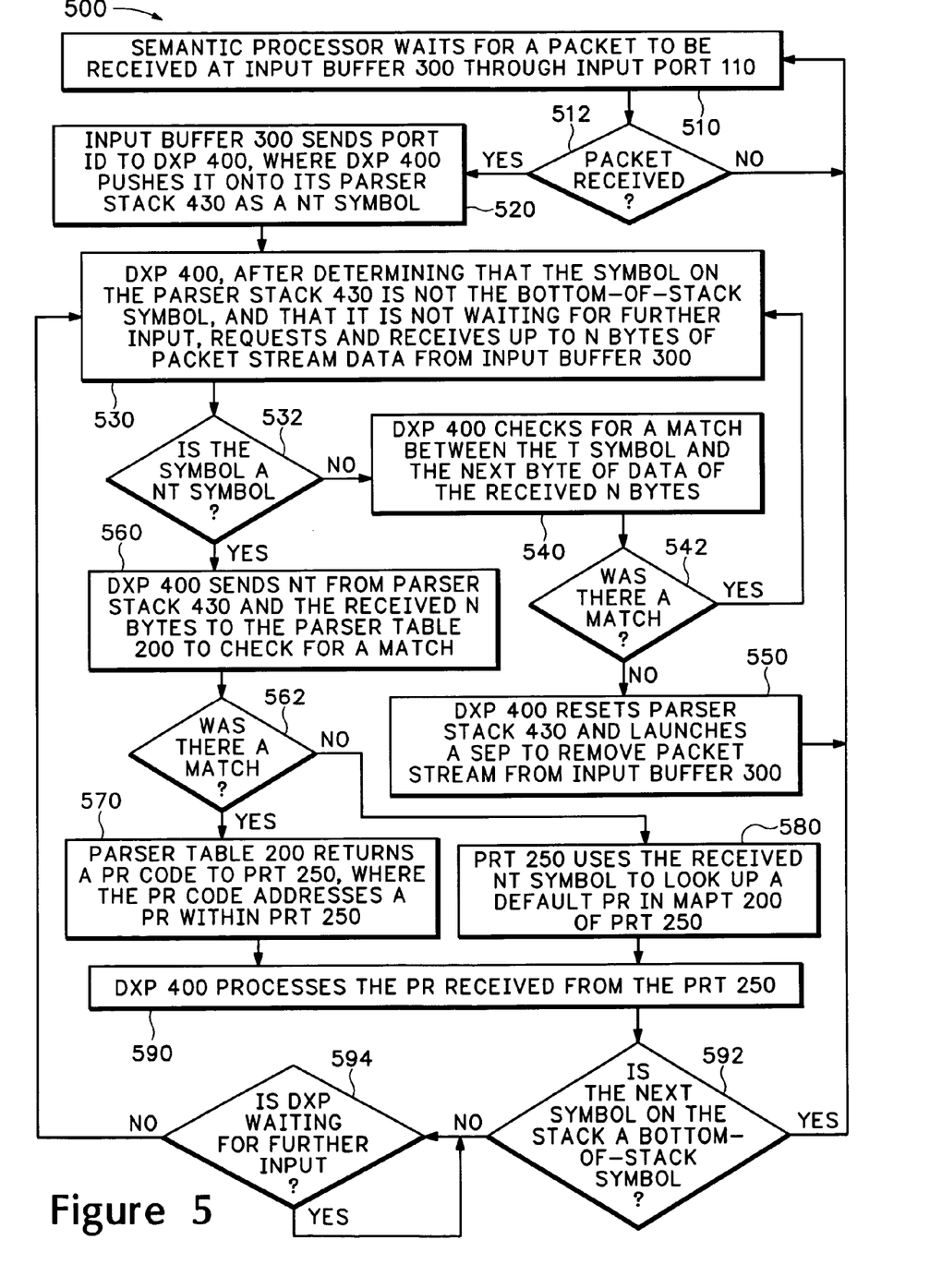
FIG. 5 contains a flow chart example for processing data input in the semantic processor in FIG. 1.
Figure 9:
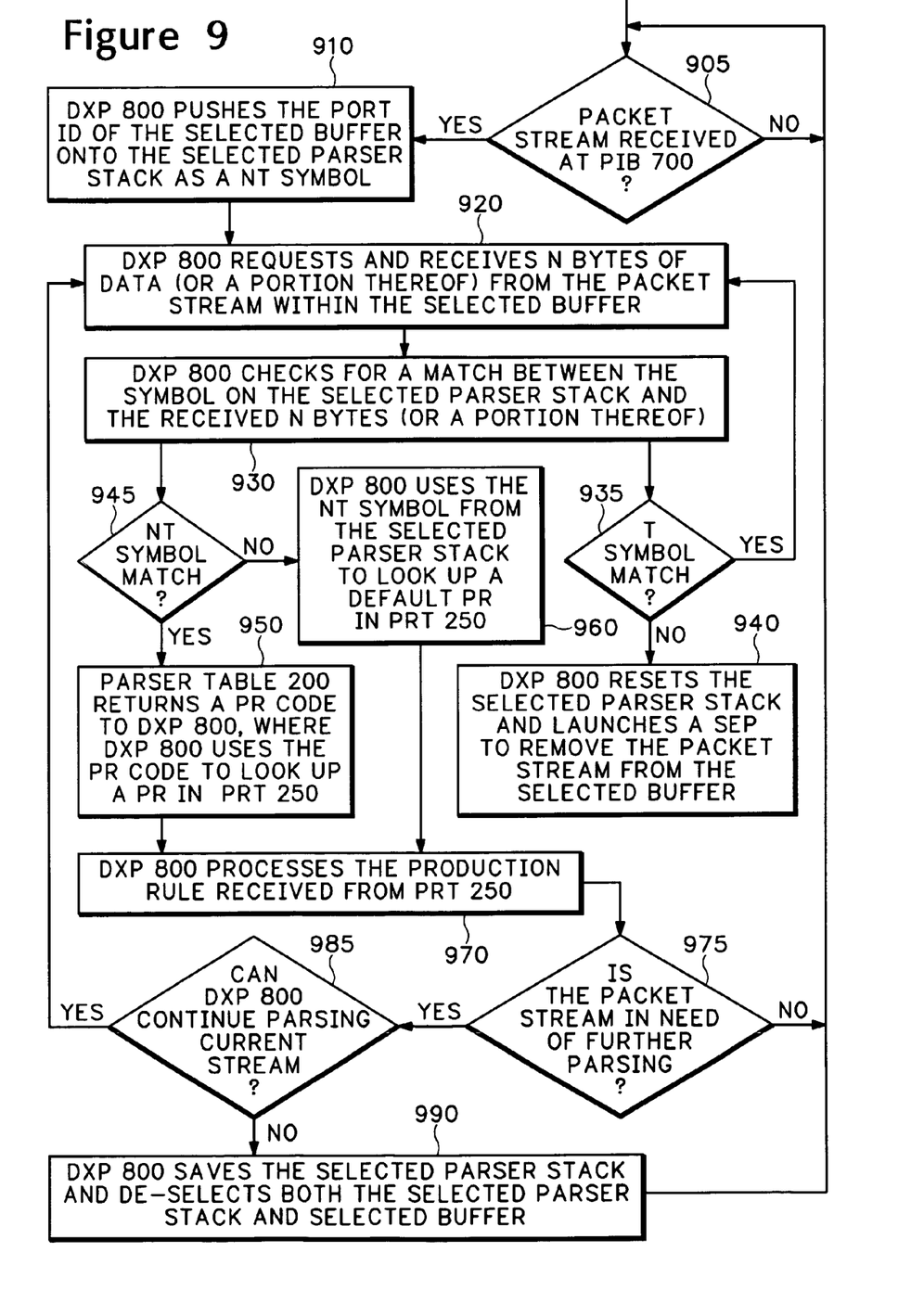
FIG. 9 contains a flow chart example for processing data input in the semantic processor in FIG. 6.

Block 970 of FIG. 9 operates in similar fashion as block 590 of FIG. 5, with the following differences. First, the symbol segment of the production rule is pushed onto the correct parser stack for the current context. Second, the skip bytes section of the production rule is used to manipulate the proper register in the data register bank, and the proper input buffer, for the current context. And third, when SEPs are sent to the SEP dispatcher, the instruction indicates the proper input buffer for execution of semantic code by a SPU.

According to a next decision block 975, DXP 800 determines whether the input data in the selected buffer is in need of further parsing. In an embodiment of the invention, the input data in input buffer 300_0 is in need of further parsing when the stack pointer for parser stack 430_1 is pointing to a symbol, other than the bottom-of-stack symbol. Preferably, FSM 410 receives a stack empty signal SE from stack handler 830 when the stack pointer for parser stack 430_1 is pointing to the bottom-of-stack symbol.

When the input data in the selected buffer does not need to be parsed further, execution returns to block 905, where DXP 800 determines whether another input buffer, other than a buffer with a stalled parser stack, has new data waiting at PIB 700.

When the input data in the selected buffer needs to be parsed further, according to a next decision block 985, DXP 800 determines whether it can continue parsing the input data in the selected buffer. In an embodiment of the invention, parsing can halt on input data from a given buffer, while still in need of parsing, for a number of reasons, such as dependency on a pending or executing SPU operation, a lack of input data, other input buffers having priority over parsing in DXP 800, etc. In one embodiment, the other input buffers that have priority over the input data in input buffer 300_0 can be input buffers that have previously had their parser stack saved, or have a higher priority as the grammar dictates. DXP 800 is alerted to SPU processing delays by SEP dispatcher 650 through a Status signal, and is alerted to priority parsing tasks by status values in stored in FSM 410.

When DXP 800 can continue parsing in the current parsing context, execution returns to block 920, where DXP 800 requests and receives up to N bytes of data from the input data within the selected buffer.

When DXP 800 cannot continue parsing, according to a next block 990, DXP 800 saves the selected parser stack and subsequently de-selects the selected parser stack, the selected register in data register bank 810, and the selected input buffer. After receiving a switch Control signal from FSM 410, stack handler 830 saves and de-selects parser stack 430_1 by selecting another parser stack within parser stack block 860.

Input stream sequence control 420, after receiving a switch signal from FSM 410, de-selects input buffer 300_0 by selecting another buffer within PIB 700 that has received input data, and data register bank 810, after receiving a switch signal from FSM 410, de-selects the selected register by selecting another register. Input buffer 300_0, the selected register, and parser stack 430_1 can remain active when there is not another buffer with new data waiting in PIB 700 to be parsed by DXP 800.

Execution then returns to block 905, where DXP 800 determines whether another input buffer, other than one with a stalled parser stack, has been received at PIB 700.

One of ordinary skill in the art will recognize that the concepts taught herein can be tailored to a particular application in many other advantageous ways. In particular, those skilled in the art will recognize that the illustrated embodiments are but one of many alternative implementations that will become apparent upon reading this disclosure.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

What is claimed is:

1. A parser comprising:
a parser stack configured to store one or more parsing symbols corresponding to different states associated with a data stream; and
a controller configured to receive one or more production rules and parse the data stream according to the production rules and the parsing symbols in the parser stack, the controller to obtain co-processor instruction identifiers from one or more of the received production rules, and where the controller is configured to initiate one or more co-processors for processing the data stream according to the co-processor instruction identifiers in at least one of the production rules.

2. The parser of claim 1 wherein at least some of the production rules include parsing symbols that are pushed onto the parser stack by the controller.

3. The parser of claim 2 wherein the controller uses the parsing symbols from the parser stack and segments of the data stream as inputs into a parser table.

4. The parser of claim 3 wherein an entry in the parser table matching the parser table inputs is used for identifying the production rules received by the controller.

5. The parser of claim 1 wherein one section of the production rules identify a skip value that the controller uses to select other segments of the data stream.

6. The parser of claim 1 wherein one section of the received production rules include code identifiers that arc used by the controller to launch operations in one or more data processing units.

7. The parser of claim 1 including a second parser stack for storing parsing symbols associated with another data stream.

8. The parser of claim 1 where at least one of the production rules includes co-processor instruction identifiers, and where the controller is configured to initiate one or more co-processors for further processing the data stream according to the co-processor instruction identifiers in the production rules.

9. A data processor, comprising:
a data input configured to receive segments of a data stream; and
a data processing unit configured to identify symbols corresponding to possible future states in the data stream, the data processing unit using both the identified symbols and the segments of the data stream to identify further instructions for processing the data stream, wherein the data processing unit receives production rules that contain the instructions for processing the data stream, the production rules containing the symbols representing the future states of the data stream, and wherein the data processing unit initiates co-processors for further processing the data stream according to co-processor instruction identifiers in the production rules.

10. The data processor of claim 9 including a stack configured to store the identified symbols.

11. The data processor of claim 10 including at least one additional stack configured to store symbols for another data stream.

12. The data processor of claim 9 wherein the data input selects additional segments of the data stream according to skip instructions in the production rules.

13. The data processor of claim 12 wherein the data processing unit identifies a next production rule according to a currently selected segment of the data stream and a currently identified symbol.

14. The data processor of claim 9 wherein the data processing unit includes a symbol stack that stores multiple previously identified symbols that correspond with multiple possible future states or contents in the data stream, the data processing unit then popping the symbols from the stack and using the popped symbols and corresponding segments of the data stream to identify new production rules.

15. A method comprising:
identifying semantic states for a data stream;
identifying segments of the data stream;
identifying data processing instructions according to the identified semantic states and the identified segments of the data stream;
processing at least a portion of the data stream according to the identified data processing instruction;
obtaining execution code identifiers from the data processing instructions; and
launching one or more co-processors that further process the data stream using the execution code identifiers.

16. The method of claim 15 including:
identifying new semantic states for the data stream from the data processing instructions;
identifying new segments of the data stream corresponding to the new semantic states; and
identifying new data processing instructions according to the new semantic states and the new segments of the data stream.

17. The method according to claim 16 including:
receiving new parsing symbols in the data processing instructions that correspond to new semantic states for the data stream;
using the new parsing symbols and new portions of the data stream to identify new data processing instructions; and
using the new data processing instructions to further process the data stream.

18. The method according to claim 17 including:
storing the parsing symbols from the data processing instructions onto a parsing stack; popping the parsing symbols from the parsing stack;
using both the parsing symbols from the parsing stack and subsequent segments of the data stream to identify the new data processing instructions.

19. The method of claim 15 including:
identifying skip commands in the data processing instructions;
identifying next segments of the data stream corresponding with the identified skip commands; and
using the identified next segments and the identified semantic states to identify new data processing instructions for processing the data stream.

* * * * *